US006360084B1

(12) United States Patent
Laquer

(10) Patent No.: US 6,360,084 B1
(45) Date of Patent: Mar. 19, 2002

(54) DUAL-BAND RF POWER TUBE WITH SHARED COLLECTOR AND ASSOCIATED METHOD

(75) Inventor: Andrew G. Laquer, Tustin, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/433,511

(22) Filed: Nov. 3, 1999

(51) Int. Cl.[7] .................................................. H04B 1/02

(52) U.S. Cl. ........................... 455/91; 455/143; 330/43; 330/124 R; 315/3.5; 315/39.3

(58) Field of Search ............................ 455/91, 98, 103, 455/143, 144, 553; 330/43, 124 R, 44; 315/3.5, 39.3

(56) References Cited

U.S. PATENT DOCUMENTS 3,723,798 A 3/1973 O'Brien
3,812,395 A 5/1974 Scott
4,232,249 A 11/1980 Alsberg
4,277,721 A 7/1981 Kosmahl
4,284,922 A 8/1981 Perring et al.
4,504,762 A 3/1985 Hart et al.
4,745,369 A 5/1988 Wanninger
4,897,609 A * 1/1990 Mallavarpu .................. 330/43
5,420,478 A 5/1995 Scheitrum
5,534,750 A * 7/1996 Theiss et al. .............. 315/5.35
5,561,353 A * 10/1996 Brichta et al. ............... 315/3.5
5,649,310 A 7/1997 Tyner et al.
5,862,462 A * 1/1999 Tyner et al. .................. 455/98
5,932,972 A * 8/1999 Symons ...................... 315/3.5

OTHER PUBLICATIONS

Gilmour, Jr., A.S., *Microwave Tubes*, Artech House, pp. 201–313, 1986.

* cited by examiner

*Primary Examiner*—William Trost
*Assistant Examiner*—Simon Nguyen
(74) *Attorney, Agent, or Firm*—Alston & Bird LLP

(57) ABSTRACT

An RF transmitter, such as a radar transmitter or a communications amplifier, is provided that includes a plurality of RF power tube sections each sharing a common collector. The RF tube sections may comprise Klystron tubes, TWT tubes or other RF power tubes known in the art. A common modulator is also typically provided to modulate electron beams produced in each of the plurality of tube sections. The RF transmitter according to the present invention is considerably lighter and smaller relative to known multi-band RF transmitter structures that employ separate collectors and modulators. An associated RF amplification method that employs a common collector is also provided.

19 Claims, 2 Drawing Sheets

DUAL-BAND RF POWER TUBE WITH SHARED COLLECTOR AND ASSOCIATED METHOD

FIELD OF THE INVENTION

This invention relates generally to high power radio frequency ("RF") amplifiers and association amplification methods utilized for radar, communications, and other applications and, in particular, to tube-type RF power amplifiers such as Klystron tubes and traveling wave tubes ("TWTs") in which RF gain is provided by the interaction of an RF signal with a modulated beam of electrons in a vacuum tube.

BACKGROUND OF THE INVENTION

For many radar and satellite communications applications, it is a common requirement to provide a radio frequency ("RF") transmitter capable of delivering very high peak or average levels of RF power, such as to generate radar pulses in a radar application or to generate a high power continuous signal in a communications application. Although solid state approaches to transmitter amplifiers have been developed in recent years and are capable of producing ever-increasing levels of RF power output, many applications at higher RF frequencies for which high peak or average power levels are required dictate the use of a traveling wave tube ("TWT") or Klystron tube-type amplifier.

A typical TWT or Klystron tube is an evacuated tube that includes at one end of the tube an electron beam source, such as an anode structure to which a high voltage is applied at an elevated temperature. The beam of electrons produced by the anode traverses the length of the tube structure and is collected by a collector located at the end of the tube opposite the anode. Because of the high flux of electrons through the tube, the collector element is typically large and bulky. In addition, a sizable heat sink is required to dissipate the large amount of heat created by the collection of the electrons.

In operation, an RF signal is introduced into the tube near the anode end. The RF signal interacts with the electron beam in a delay or "slow wave" structure inside the tube so as to be amplified considerably in the tube. By extracting the RF signal near the end of the tube, a high level of peak or continuous RF power can be delivered.

A traveling wave tube amplifier ("TWTA") generally consists of a TWT plus an associated high voltage power supply. Within the tube structure, a TWT typically includes a slow wave structure that surrounds the electron beam and that extends in a lengthwise direction through the tube. By transmitting RF signals along the slow wave structure, the RF signals interact with the electron beam and are amplified in a continuous manner throughout the length of the slow wave structure. A TWT also generally includes a plurality of focusing magnets along the length of the tube, as well as an attenuator for reducing waves that would otherwise travel backward or upstream through the tube.

A Klystron tube also requires a high voltage power supply. In contrast to TWTs, a Klystron tube usually includes several discrete cavities in which the RF signals are amplified. Although the RF signals are carried between cavities by the electron beam, there is no coupling of the RF signals between the cavities such that the amplification of the RF signals is not continuous throughout the length of the tube.

In addition to the TWTs described above, coupled cavity TWTs have been designed that essentially include several tens of Klystron-like cavities that are electromagnetically coupled together so that RF signals can propagate therethrough. See A. S. Gilmour, Jr., *Microwave Tubes, Artech House* (1986) for a discussion on Klystron tubes and TWTs.

In many applications in which TWT and Klystron type tubes are deployed, such as satellite communications applications, it is often important to minimize the weight and size of transmitter hardware for a number of reasons. As a result of the size and weight of all the tube structures including the collector element, however, TWT and Klystron type tubes are inherently bulky and heavy, when compared to solid state alternatives, for example. As such, the weight and size of the collector in such a tube-based transmitter is often a significant portion of overall transmitter weight and size. The weight and size of the tube is often an important design driver for the radar system or the satellite transmitter as a whole. As a result, transmitter system designers have employed a number of techniques in an attempt to minimize weight and size. For example, U.S. Pat. No. 4,232,249 to Dietrich A. Alsberg proposes a TWT structure having a single anode or electron gun component for generating an electron beam that can be controllably deflected so as to travel through either one of two different delay structures for collection by different respective collectors, each of which may be thermally connected to a common collector heat sink.

In some radar or communications applications, high RF power levels must be generated at each of two or more distinct RF frequencies. For example, some communications systems operate at multiple frequencies, and some radar systems utilize multi-frequency transmitters to improved radar system performance. If the various transmitter frequencies in a multi-frequency system are sufficiently adjacent in frequency, a single TWT or Klystron tube may be employed to provide RF gain and power at all necessary frequencies. However, in some applications, the various transmitter frequencies are separated so widely in frequency that a common TWT or Klystron cannot be used. In those applications, multiple TWTs or Klystrons must be employed, each of which includes a relatively large and bulky collector element and high voltage power supply. As such, the resulting transmitter system will also be disadvantageously large and heavy which may limit the effectiveness of the transmitter system in weight-sensitive applications, such as in satellite or airborne hardware applications.

SUMMARY OF THE INVENTION

According to the present invention, an RF transmitter and an associated method are provided for producing a plurality of amplified output signals in response to a plurality of RF input signals. The RF transmitter of the present invention includes a plurality of RF tube sections. Each tube section defines an input and an output through which RF signals are introduced and extracted, respectively. Typically, each tube section amplifies RF signals having different frequencies, although RF signals of the same frequency can also be amplified. Each RF tube section includes an anode for producing an electron beam that passes through the tube section so as to amplify the RF signals. According to the present invention, the RF transmitter also includes a common collector for collecting each of the electron beams following propagation through the respective RF tube sections. In this regard, the common collector is preferably disposed proximate to the end of each RF tube section that is opposite the anode end to facilitate collection of each of the electron beams. By employing a common collector for each RF tube section, the weight and size of the RF transmitter is advantageously reduced relative to conventional RF transmitters having a plurality of tube sections with separate collectors for separately amplifying the different RF signals.

In addition to sharing the common collector, the RF transmitter can include a modulator that is shared by each of the RF tube sections for modulating each of the electron beams. In addition, the plurality of RF tube sections preferably cooperate to define a common vaccum tube, such as a Klystron tube or a traveling wave tube. The RF transmitter can also include a power supply for energizing the RF tube sections and a heat sink for dissipating heat generated in the common collector as electron beams are collected.

By utilizing common components, such as a common collector and, in some embodiments, a common modulator, the RF transmitter and associated method of the present invention permit a plurality of RF signals, each potentially having a different frequency, to be amplified by respective RF tube sections while still reducing the overall weight and size of the RF transmitter in comparison to conventional designs having a plurality of RF tube sections with separate components, i.e., separate collectors. Accordingly, the RF transmitter and associated method of the present invention are particularly advantageous for applications in which the cumulative weight and size are to be minimized, such as satellite communications and other airborne or space-related applications.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
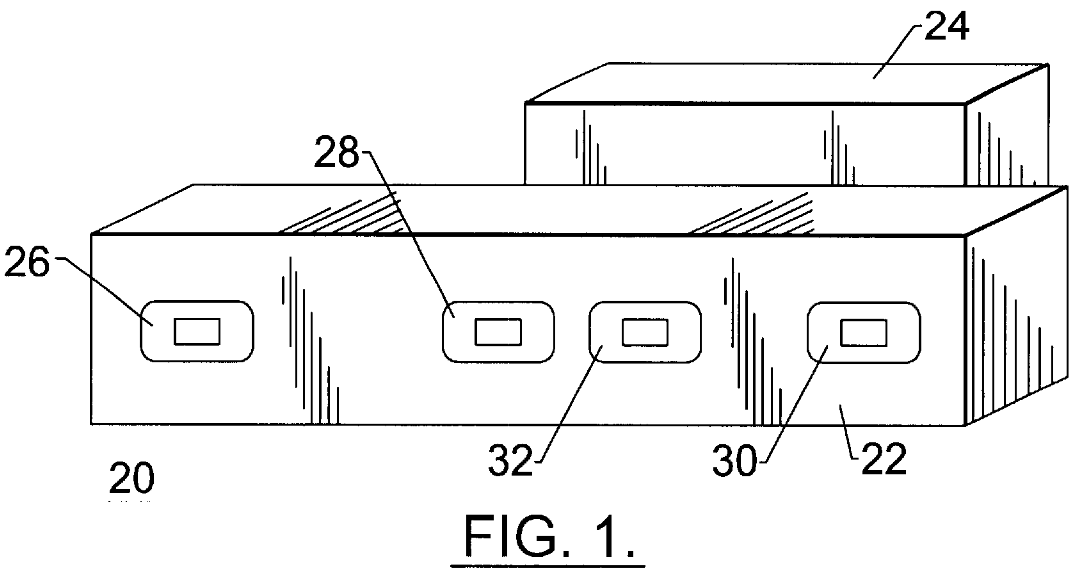
FIG. 1 is a perspective view of a dual-band RF transmitter and associated power supply according to one embodiment of the present invention.

An RF transmitter 20, such as a radar transmitter or a communications amplifier, according to one embodiment of the present invention is illustrated in FIG. 1. The RF transmitter includes a tube housing 22, typically formed of a light metal. The RF transmitter also includes a TWT tube, a Klystron tube, or other suitable high power vacuum tube disposed within the tube housing for amplifying RF signals. In addition, the RF transmitter includes a power supply 24 that typically has collector and beam voltage supplies and a bias voltage supply as described below in more detail in conjunction with FIG. 3. The RF transmitter and, in some embodiments, the power supply can also include a heater supply and an electron beam modulator as also described below in conjunction with FIG. 3. In the dual RF transmitter 20 according to the present invention and as illustrated in FIG. 1, the RF transmitter defines two sets of RF inputs and outputs designated the first and second RF inputs and the first and second RF outputs. In this regard, a first RF signal is applied to the first RF input 26 for amplification by transmitter 20. The amplified RF output that is produced by the transmitter 20 is then provided at first RF output 28. Similarly, the second RF signal to be amplified is presented to second RF input 30 of transmitter 20 and the corresponding amplified signal is provided at second RF output 32. Preferably, the first and second RF signals have different frequencies.

Figure 2:
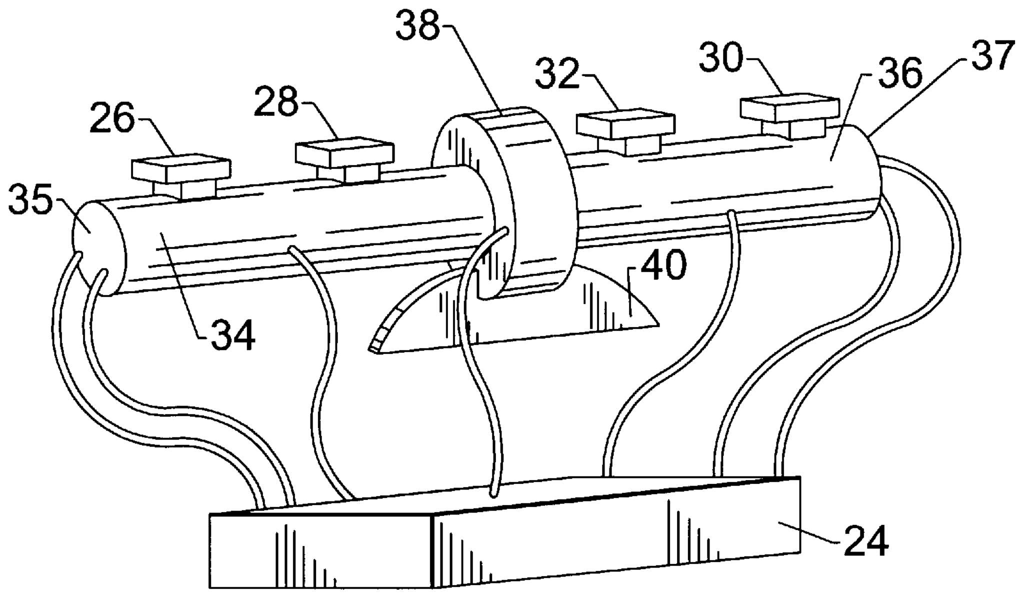
FIG. 2 is a perspective view of a pair of RF transmitter tube sections that share a common collector along with a shared power supply according to one embodiment of the present invention.

Referring now to FIG. 2, a perspective view of a tube structure having a common collector 38 for amplifying two RF signals according to one embodiment of the present invention is illustrated. For purposes of illustration, however, the tube housing is not depicted such that the tube structure can be more clearly seen. FIG. 2 also depicts a power supply 24 that supplies appropriate power and modulator signals to the shared collector tube structure, as described below. In more detail, the tube structure of FIG. 2 includes first and second tubes joined by a common collector. The first tube 34 includes a first anode 35 at one end and the shared collector 38 at the opposite end. Likewise, the second tube 36 includes a second anode 37 at one end and the shared collector 38 at the other end. In response to voltage provided by the power supply, the first and second anodes 35, 37 generate respective beams of electrons that are directed down the length of the first and second tubes 34, 36 to be collected by the shared collector 38. In this regard, the collector is also preferably maintained at a predetermined voltage level by the power supply to facilitate collection of the element beams. The collection of the electron beams generates considerable heat. As such, the RF transmitter 20 also preferably includes a collector heat sink 40 that is designed to dissipate the heat.

The RF transmitter 20 of the present invention is therefore capable of amplifying RF signals having two different frequencies in a single tube structure having a shared collector 38 and collector heat sink 40. In this regard, in the RF transmitter 20 of the present invention, electrons arrive at the shared collector 38 from opposite sides with the electrons that travel through the first tube 34 arriving from one side of the collector and the electrons that travel through the second tube 36 arriving from the other side of the collector. The RF transmitter of the present invention thus permits the use of a single vacuum tube element comprising the first and second tube sections 34 and 36 and the single shared collector 38. As described below in conjunction with FIG. 3, a single modulator can also serve to modulate the RF signals of both the first and second tubes. Considerable weight and bulk may thus be saved relative to a conventional dual band RF transmitter having two separate tube structures with entirely different components.

Figure 3:
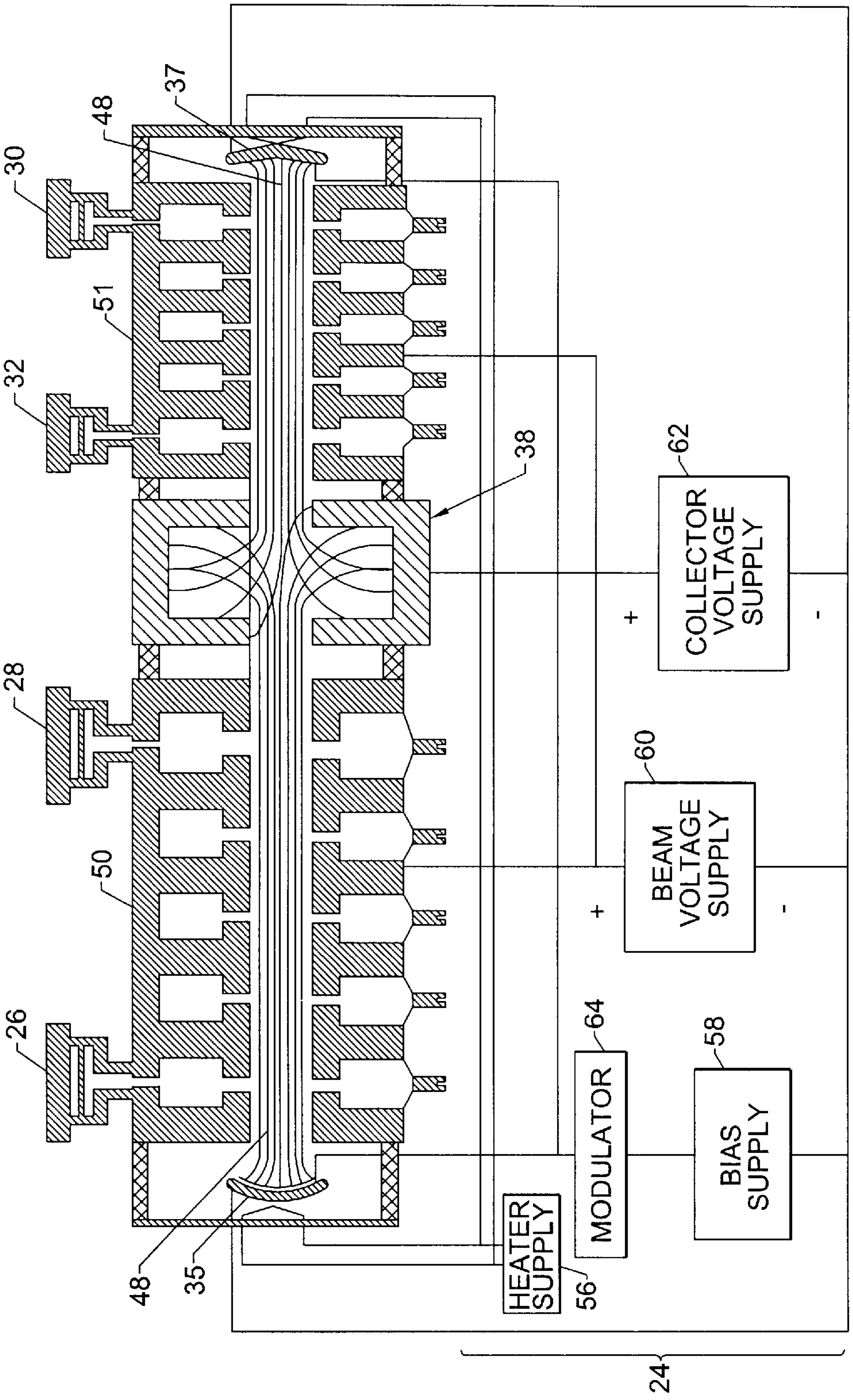
FIG. 3 is a cross sectional view of a dual-band RF transmitter according to one advantageous embodiment of the present invention.

In FIG. 3, a cross section of a dual-band RF transmitter 20 with a shared collector 38 according to one embodiment of the present invention is presented, along with schematic representations of the power supply circuitry. On either side of the shared collector 38, the RF transmitter includes the first and second tubes. Each tube includes a respective anode 35, 37 for generating an electron beam 48 in response to an appropriate supply voltage. The first and second tubes also include delay or cavity structures 50, 51 extending between the respective anode and the common collector. As such, the electron beams 48 traverse the length of the respective tubes, thereby passing through a cavity or delay structure prior to being collected by the shared collector 38.

As known to those skilled in the art, the electron beams serve to amplify the RF signals. In this regard, the RF signals introduced into the first tube at first RF input 26 are amplified by the interaction of the RF signals with the electron beam 48 in first cavity or delay structure 50. The amplified RF signals can then be extracted from the first RF output 28. Likewise, the RF signals that are introduced into the second tube at the second RF input 30 interact with the electron beam generated by second anode 37 in the second delay structure 51, and the resulting amplified RF signals can be extracted from the second RF output 32.

As shown in FIG. 3 and as mentioned above, the RF transmitter 20 can also include a heater supply 56, a bias voltage supply 58, a collector voltage supply 62, a beam voltage supply 60, a modulator 64. As known to those skilled in the art, the heater supply 56 heats the first anode 35 and the second anode 37 to promote the formation of electron beams 48 within each of the two tube sections. As also known to those skilled in the art, the bias voltage supply 58 and the collector voltage supply 62 cooperate to provide a voltage differential between the shared collector 38 and the respective anodes. In addition, the beam voltage supply 60 sets the voltage level of the first and second delay structures 50, 51 and the modulator 64 modulates the respective electron beams in a manner known to those skilled in the art. With respect to modulation, a dual-band RF transmitter can include a grid that is proximate the anode and that is driven by the modulator to alternately turn on and off the entire electron beam, thereby alternately turning on and off the amplification of the RF signals. In one embodiment, the modulator provides a square wave of modest voltage and current to alternately drive the grid voltage positive and negative. By amplitude modulating the electron beam with a square wave having small rise and fall times, the electron beams can quickly be switched off and on. While the RF transmitter of the present invention can include separate heater supplies, bias voltage supplies, beam voltage supplies, collector voltage supplies and modulators for each tube section, the cost and weight of the RF transmitter is reduced by utilizing common components for each tube section as depicted in FIG. 3.

Although the RF transmitter 20 of the present invention can be configured in a number of different manners depending upon the application, one example of an RF transmitter is hereinafter provided for the sake of illustration. In this example, the RF transmitter includes a pair of RF tube sections having respective inputs and outputs as shown in FIG. 3. For example, the first input can have a frequency of 30 GHz and the second input can have a frequency of 42 GHz. Once the bias voltage supply 58 and the collector voltage supply 62 have cooperated to apply a voltage of 15 to 20 KV between the collector 38 and the respective anodes 35, 37 and the heater supply has heated the anodes to an adequate temperature, electron beams are generated that propagate through the respective tube sections. In addition, the electron beams can be modulated. In this regard, the modulator can operate the grid in order to cause pulsing modulation of the electron beams. As a result of the amplification of the respective RF signals, RF output signals can be extracted from the respective RF outputs that have been amplified by 10–45 dB. As shown by this example, the RF transmitter and associated method of the present invention therefore permit RF signals of different frequencies to be amplified while reducing the overall size and weight of the RF transmitter by employing common components, such as a common collector and a common modulator.

Accordingly, an RF transmitter 20 according to the present invention may be constructed in which the collector 38 is shared between two tube sections that provide power gain or amplification for two or more RF signals that typically have different frequencies. As can be appreciated from FIG. 3, the length and weight of the RF transmitter 20 of the present invention that includes a shared collector for each of the tube sections can be considerably shorter and lighter than conventional RF transmitters having two entirely separate tube structures, each with its own collector, for generating two different frequencies. In addition to sharing the collector, the RF transmitter of one embodiment of the invention can also share other components, such as a common modulator 64, a common heater supply 56, a common bias voltage supply 58, a common beam voltage supply 60, a common collector voltage supply 62 and a common collector heat sink 40. In addition the RF transmitter can include a single vacuum tube element that includes each of the tube sections. As such, the resulting RF transmitter is capable of separately amplifying RF signals having two different frequencies with a shared collector configuration that is less expensive, smaller and lighter than conventional designs that would require two separate tube structures.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A radio frequency ("RF") transmitter for providing a plurality of amplified RF output signals in response to a plurality of RF input signals, the RF transmitter comprising:

a plurality of RF tube sections through which a plurality of electron beams propagate, wherein each RF tube section defines an input and an output through which RF signals are introduced and extracted, respectively, such that each RF tube section is capable of supporting the propagation of different RF signals, each RF tube section also capable of supporting the propagation of a distinct electron beam for amplifying the respective RF signals; and a common collector for collecting each of the electron beams following propagation through the respective RF tube sections, the common collector being shared by each RF tube section.

2. An RF transmitter according to claim 1 further comprising a modulator for modulating each of the electron beams, the modulator being shared by each RF tube section.

3. An RF transmitter according to claim 1 wherein the plurality of RF tube sections cooperate to define a common vacuum tube.

4. An RF transmitter according to claim 3 further comprising a collector heat sink for dissipating heat generated in the common collector as the collector collects the electron beams.

5. An RF transmitter according to claim 3 wherein the common vacuum tube comprises a Klystron tube.

6. The RF transmitter according to claim 3 wherein the common vacuum tube comprises a traveling wave tube.

7. An RF transmitter according to claim 1 further comprising a power supply for energizing the RF tube sections.

8. An RF transmitter according to claim 1 wherein each RF tube section operates at an RF operating frequency that is different from the RF operating frequency of each of the other RF tube sections.

9. A radio frequency ("RF") transmitter for producing a plurality of amplified RF output signals in response to a plurality of RF input signals, the RF transmitter comprising:

a plurality of RF tube sections, each tube section having opposed ends and defining an input and an output, each RF tube section also including an anode at one end for producing an electron beam that passes lengthwise through the tube section such that a different respective electron beam passes through each RF tube section; and a common collector disposed proximate the end of each RF tube section opposite the anode for collecting each of the electron beams following propagation through the RF tube sections.

10. An RF transmitter according to claim 9 further comprising a modulator for modulating each of the electron beams, the modulator being shared by each RF tube section.

11. An RF transmitter according to claim 9 wherein the plurality of RF tube sections cooperate to define a common vacuums.

12. An RF transmitter according to claim 11 further comprising a collector heat sink for dissipating heat generated in the common collector as the collector collects the electron beams.

13. An RF transmitter according to claim 11 wherein the common vacuum tube comprises a Klystron tube.

14. The RF transmitter according to claim 11 wherein the common vacuum tube comprises a traveling wave tube.

15. An RF transmitter according to claim 9 further comprising a power supply for energizing the RF tube sections.

16. An RF transmitter according to claim 9 wherein each RF tube section operates at an RF operating frequency that is different from the RF operating frequency of each of the other RF tube sections.

17. A method amplifying a plurality of RF signals comprising:

generating a plurality of electron beams that propagate through respective RF tube sections such that a different respective electron beam propagates through each RF tube section;

introducing a respective RF input signal into an input of each RF tube section for propagation through the RF tube section along with a respective electron beam to thereby amplify each of the plurality of RF signals;

extracting a respective RF output signal from an output of each RF tube section following amplification thereof; and commonly collecting the plurality of electron beams that propagate through the respective RF tube sections with a shared collector.

18. A method according to claim 17 further comprising commonly modulating each of the plurality of electron beams.

19. A method according to claim 17 wherein said introducing step comprises introducing RF signals having different frequencies into each RF tube section.

* * * * *

UNITED STATES PATENT AND TRADEMARK OFFICE

CERTIFICATE OF CORRECTION

PATENT NO. : 6,360,084 B1
DATED : March 19, 2002
INVENTOR(S) : Laquer

It is certified that error appears in the above-identified patent and that said Letters Patent is hereby corrected as shown below:

Column 7,
Line 21, "vacuums" should read -- vacuum tube --.

Signed and Sealed this

Third Day of September, 2002

*Attest:*

JAMES E. ROGAN
*Director of the United States Patent and Trademark Office*

*Attesting Officer*